United States Patent [19]

Dean, Jr.

[11] 3,876,138
[45] Apr. 8, 1975

[54] DUCT PRESSURE ACTUATED VARIABLE VOLUME DEVICE

[75] Inventor: Frank J. Dean, Jr., Kansas City, Mo.

[73] Assignee: Tempmaster Corporation, Kansas City, Mo.

[22] Filed: Dec. 6, 1973

[21] Appl. No.: 422,423

Related U.S. Application Data

[62] Division of Ser. No. 327,011, Jan. 26, 1973, Pat. No. 3,817,452.

[52] U.S. Cl. ............ 236/49; 236/80; 236/87; 251/58
[51] Int. Cl. ............ F24f 11/04; G05b 11/46
[58] Field of Search ........ 236/49, 87, 80; 251/58 X, 251/24 X

[56] References Cited
UNITED STATES PATENTS

| | | | |
|---|---|---|---|
| 3,414,193 | 12/1968 | Franz | 236/87 X |
| 3,727,835 | 4/1973 | Rifkin et al. | 236/49 |
| 3,743,180 | 7/1973 | Perkins et al. | 236/49 X |
| 3,779,275 | 12/1973 | Ley et al. | 236/49 X |

Primary Examiner—William E. Wayner
Attorney, Agent, or Firm—Lowe, Kokjer, Kircher

[57] ABSTRACT

A self contained unit for controlling the volume of airflow through an air duct ventilation system has an inflatable bag which is operated by the pressure of airflow in the duct to variably position a normally open damper and control airflow through the duct. Inflation of the bag pivots an overlying plate and connecting linkage to reliably position the damper. A pneumatic thermostat controls exhaust flow from the bag to adjust pressure therein. An aspirating nozzle in the thermostat is fed with relatively high velocity airflow from the duct, and by aspiration induces a flow of ambient air through the thermostat and across a bimetallic, thermally responsive control element thereof which moves in response to changes in temperature to vary pressure in the bag.

12 Claims, 8 Drawing Figures

DUCT PRESSURE ACTUATED VARIABLE VOLUME DEVICE

This is a divisional of application Ser. No. 327,011, filed Jan. 26, 1973, now U.S. Pat. No. 3,817,452.

BACKGROUND AND BRIEF DESCRIPTION OF THE INVENTION

This invention relates to improvements in controlling the volume of airflow through air duct ventilation systems such as are commonly utilized in heating or cooling homes, office buildings, and the like.

Heating and/or cooling systems for large buildings normally include ventilation ducts within or secured to the walls, floors or ceilings thereof, and individual temperature control for separate rooms or sections of the building is provided by varying the volume of airflow through the duct and air outlet supplying the area. A damper in the air duct, which may feed one or more air discharge outlets or "air diffusers," is positionable to variably restrict or meter the airflow through that duct. Such systems are desirable for their high efficiency and low cost since a single, large heating or cooling unit can supply airflow to several rooms on the entire building, without sacrifice of individual temperature control for each room which is accomplished by separate control of airflow volume to each room.

A problem associated with all such systems exists in controlling the damper movement with sufficient precision and repeatability to maintain comfortable and relatively constant environmental conditions. The relatively large airflow volume in the duct which is being directly metered by the damper, along with variation in volume and pressure of the cooling or heating air being supplied to the duct, poses difficulties of slow response, oscillation and generally erratic control, by either manual or automatic controls, in precisely positioning the damper to offer varying degrees of restriction to the airflow.

Other attempts at controlling airflow volume using duct air pressure have used complex and costly control devices of minimum flexibility and awkward, unsightly appearance, but even these sacrifices in design parameters have not been entirely successful in providing a control system free from the operational problems of sluggish and erratic operation. A relatively great amount of power is required to operate the damper, and for maximum efficiency the damper is moved by inflation of a bellows arrangement fed with pressurized air usually from the air duct itself. The bellows is of a large size to operate at low pressures and has a long stroke to minimize the pressure required within the bellows to shift the damper from a fully closed to a fully open position. The size of the bellows has dictated that it be mounted outside the duct, creating problems in installation space as well as detracting from appearance of the ventilation system. It has been found, however, that even with large bellows a relatively high static pressure head must be developed within the duct before the damper is opened by the bellows. This high static pressure markedly detracts from overall efficiency.

It is an important object to the present invention to provide a volume control mechanism for air duct ventilation systems wherein a damper plate utilized to restrict airflow through the duct is normally open to minimize the static pressure developed in the duct. A corollary to this is to provide a damper in the form of a plate eccentrically mounted on a pivotal axis transverse to the direction of airflow through the duct so that pressure of the airflow, along with gravitational forces, urges the damper to a normally open position.

Another important object of the invention is to provide a pneumatic bladder or bag of desired, economical configuration which is connected to operate the damper by an overlying, rigid plate and rigid connecting linkage so that inflation of the bladder rotates the damper in proportion to pressure in the bladder for reliable, effective volume control, while presenting a simplified, less costly, and more aesthetic construction that eliminates the use of bulky and awkward bellows.

A more particular object in accordance with the preceding is to provide such an arrangement which is configured to produce a mechanical advantage between the bladder and the plate so that a relatively small degree of inflation of the bladder at low pressures will cause substantial movement of the damper. This is accomplished by pivotally mounting one end of the plate overlying the bladder to the air duct, while interconnecting its opposite end to the damper so that inflation of the bladder (which nominally engages the overlying plate at its center) swings the damper through an arc equal to the arc of travel of the outer end of the plate overlying the bladder.

Another very important object of the present invention is to provide a thermostat for automatically controlling mechanisms such as those set forth in the preceding objects, which includes an integral structure that induces by aspiration a flow of ambient air through the thermostat housing so that the thermostat reliably operates in response to temperature of room air, the integral arrangement of the aspirator and thermostat providing a compact, aesthetically pleasing unit.

More particularly, the present invention provides such an aspirating thermostat in which the aspirator is fed with high velocity air from the duct of the ventilation system and directs it through an enlarged outlet in the housing of the thermostat to induce the flow of ambient air through an inlet in the housing, across a bimetallic thermally responsive element, to discharge through the outlet along with the aspirating flow. A corollary aim is to provide such a thermostat wherein the bimetallic element acts as a pneumatic valve in adjustably restricting exhaust flow from the pneumatic bladder to thereby control the volume of the airflow in the duct in relation to temperature of the ambient air to maintain constant ambient air temperature.

Another important object of the invention is to provide a pneumatic system for use in conjunction with a pneumatic operator such as the bladder and damper arrangements as described in the preceding objects, wherein the bladder is fed with pressurized air from the duct through a conduit that connects with the bladder across an aspirating tee so as to induce exhaust flow from the bladder to provide a highly responsive, reliable control of pressure in the bladder.

More particularly it is an object of the invention to provide such a pneumatic control system which includes an aspirating thermostat as above described that is connected with the pressure conduit downstream of the bladder to automatically control exhaust flow and pressure in the bladder in relation to temperature of the ambient air. Additionally, the control system includes an adjustable restrictor and a small bleed port in the conduit downstream of the aspirating tee which are manually adjustable to respectively establish the maximum and minimum limits on pressure in the bladder and volume of airflow through the duct regardless of the operation of the thermostat.

These and other objects of the invention, together with the features of novelty appurtenant thereto, will appear in the course of the following description.

DETAILED DESCRIPTION OF THE INVENTION

In the accompanying drawings which form a part of this specification and are to be read in conjunction therewith and in which like reference numerals are employed to indicate like parts in various views.

Figure 1:
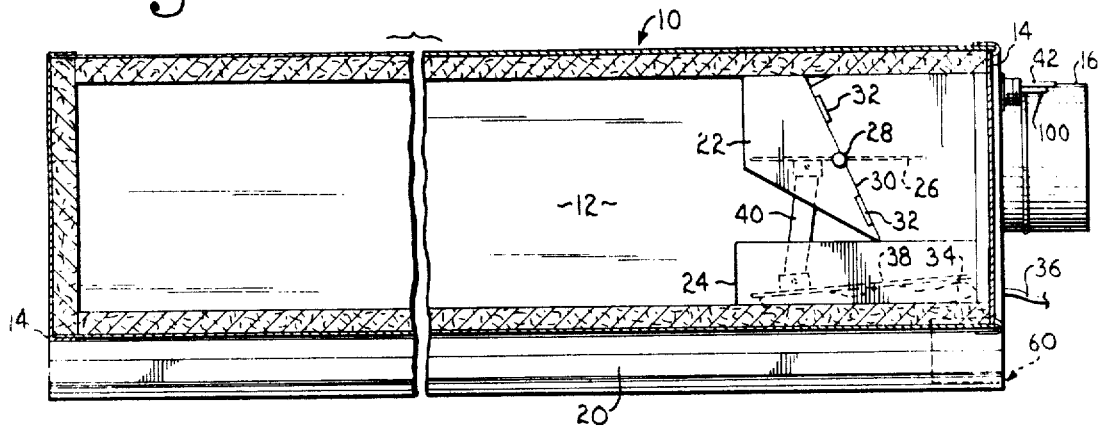
FIG. 1 is a sectional view of an air duct comprising a portion of a ceiling ventilation system with a self contained variable volume control constructed in accordance with the principles of the present invention.
Figure 2:
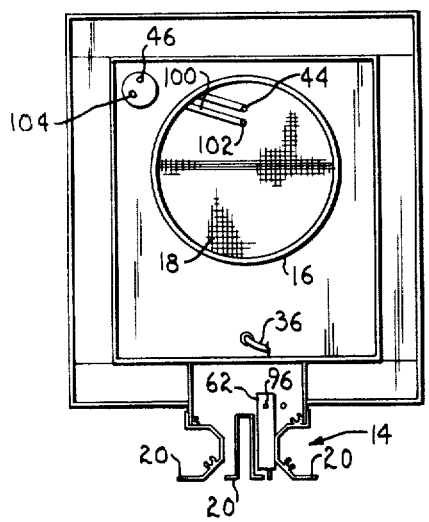
FIG. 2 is a right end elevational view of the structure of FIG. 1.

Referring now more particularly to FIGS. 1–5, the reference numeral 10 denotes a portion of an integrated ceiling system which includes a rectangular plenum 12 which is adaptable to later described air diffuser slot structures generally indicated by the numeral 20. It is contemplated that the slot will be supported at their end portions and T-bar flanges. A circular inlet 16 supplies a flow of heating, cooling, or ventilating air into the duct through a fine mesh filter screen 18, and the airflow is directed into the room by the air diffuser in the form of an elongated slot extending along the bottom of the duct.

Adjacent inlet 16 and disposed wholly within duct 12 is a baffle support 22 and an underlying enclosure box 24 which extend transversely across the width of the duct. Baffle support 22 presents a rectangular opening through which substantially the entire airflow from inlet 16 must pass.

Also located entirely inside duct 12 is a variable volume control mechanism that includes a rectangular damper plate 26 of a configuration corresponding to the opening in support 22. Damper plate 26 is pivotally mounted to the sides of the duct, such as by opposing trunnions 28, to rotate about an axis extending generally transversely to the direction of airflow in the duct. The trunnions are offset from the center of the damper plate so that the left-hand portion thereof (shown in broken lines in FIG. 1) is slightly larger in area and weight causing the damper plate 26 to be urged both by gravitation and the airflow through the duct to its normally open position illustrated wherein plate 26 lies generally parallel to the airflow offering minimum restriction thereto. Plate 26 is pivoted from this position to a closed position lying generally parallel to an inclined face 30 of support 22 in engagement with soft contact pads 32 thereon. In the closed position the damper plate substantially completely blocks airflow through duct 12.

Contained inside enclosure 24 is an inflatable member in the form of a bag or bladder 34 of any desired configuration and preferably made of polypropylene material. An air inlet and exhaust for bladder 34 extends through the right hand wall of the air duct, and a flexible conduit 36 connects therewith. Overlying bladder 34 is a rigid plate 38 having its right-hand end (in FIG. 1) hinged to the walls of duct 12 to rotate relative thereto. The opposite end of hinged plated 38 pivotally attaches to an upright connecting linkage or arm 40 which freely extends through a suitable opening in the upper face of enclosure 24 to be pivotally attached to the left side of damper plate 26. The weight of the interconnected arm 40 and hinged plate 38 assists in urging damper plate to its fully open position.

Preferably, bladder 34 receives pressurized air from the ventilation duct itself upstream of damper 26. To this end conduit 36 terminates in a rigid U-shaped fitting 42 disposed adjacent inlet 16 and having one end 44 opening into inlet 16 and an opposite end 46 terminating outside the inlet. Conduit 36 connects with end 46 to supply air to bladder 34.

The actuating means presented by bladder 34, plate 38 and arm 40 reliably rotate damper 26 in direct relation to the degree of inflation and pressure within bladder 34. Regardless of the configuration of bladder 34, the overlying hinged plate will pivot in proportion to the degree of inflation of the bladder, thereby allowing use of a bladder in a bag-like or other configuration of desired size.

Upon inflation, bladder 34 nominally engages hinged plate approximately mid-way between the opposite ends thereof so that a multiplication in the length of drive of arm 40 and damper 26 results since these latter elements are driven through a distance in proportion to the arc traced by the outer end of hinged plate 38. Additionally, the pivotal connection of arm 40 is near trunnions 28 to further increase the stroke of damper plate 26 for a given degree of inflation of the bladder. The arrangement allows a low pressure and small degree of inflation of the bladder to drive the damper through a substantial portion of its stroke.

Inflation of the bladder closes the damper to reduce airflow through the duct, while deflation of the bladder allows the damper to return toward its normally open position and increase airflow. Very low static pressure heads are built up upstream of the damper upon start-up or during low rates of flow due to the normally open position of the damper. But upon slight airflow through the duct, sufficient pressure is generated within the bladder to begin adjusting the airflow by pivoting the damper.

Figure 5:
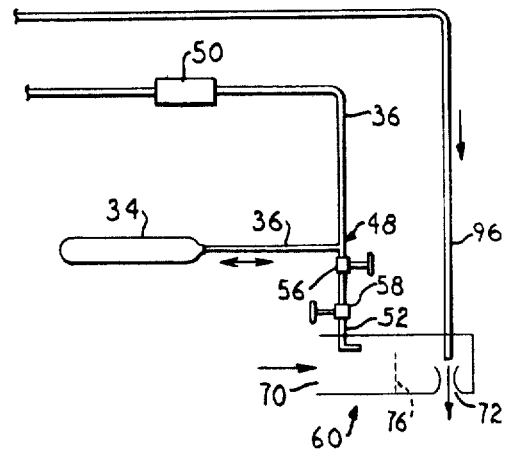
FIG. 5 is a schematic representation of the pneumatic controls utilized in conjunction with the FIG. 1 arrangement.
Figure 6:
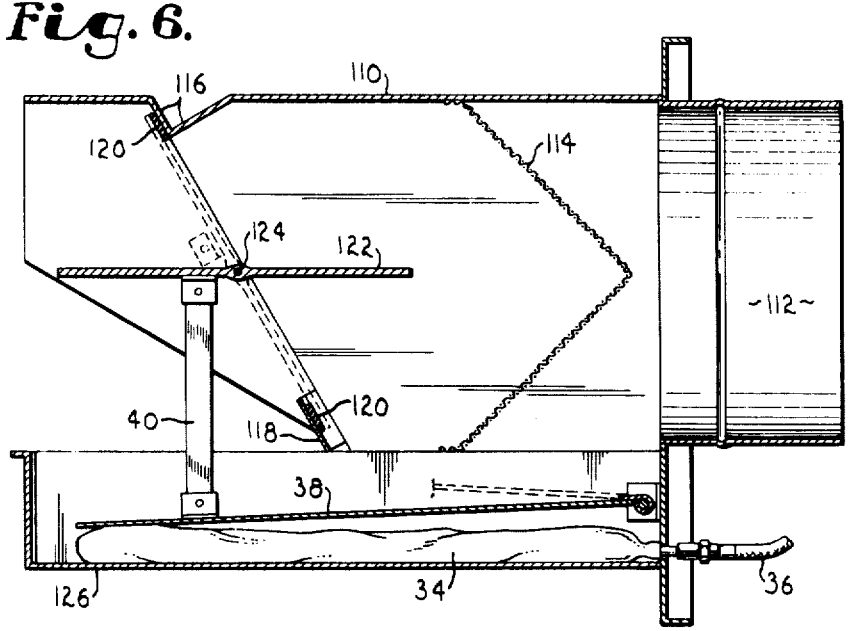
FIG. 6 is another embodiment of the invention as incorporated within a ventilation duct.
Figure 7:
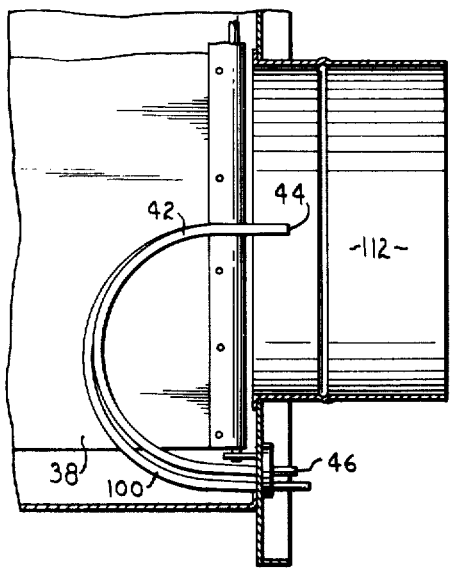
FIG. 7 is a top plan view in cross-section of the FIG. 6 arrangement.
Figure 8:
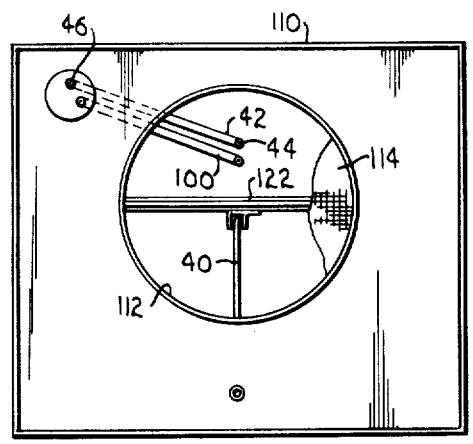
FIG. 8 is an end view of the structure of FIG. 6.

Pneumatic controls for automatically adjusting the pressure within bladder 34 are schematically illustrated in FIG. 5 wherein it is clearly illustrated that a right angle tee connection 48 interposed in conduit 36 forces a sharp turn in the airflow in and out of bladder 34. A filter 50 is disposed in conduit 36 upstream of tee 48 and a section 52 of the conduit continues on downstream of tee 48. Downstream section 52 terminates in an open end 54 to allow airflow to escape from conduit 36 and bladder 34. A manually adjustable flow restrictor 56 and an adjustable bleed port 58, both of conventional design, are interposed in downstream section 52. Restrictor 56 dictates the maximum rate of exhaust flow therethrough toward open end 54, (and therefore limits the maximum quantity of airflow through the damper) regardless of a buildup of pressure in the main air conditioning supply duct or the setting of the thermostat and bleed port 58 presents a relatively small orifice open to the ambient air which allows escape of a certain minimum rate of exhaust flow from section 52 at all times.

Figure 3:
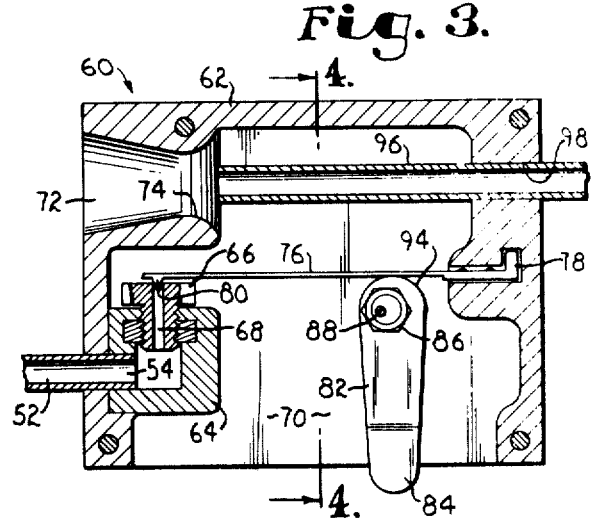
FIG. 3 is an enlarged sectional longitudinal view of an aspirating thermostat as contemplated by the present invention and as utilized in the FIG. 1 construction.
Figure 4:
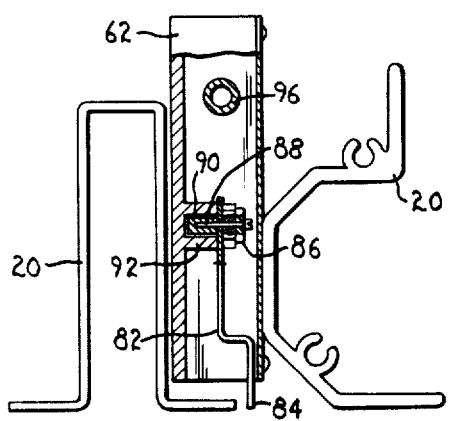
FIG. 4 is an enlarged, cross-sectional end view of the thermostat of FIG. 3.

The pneumatic controls further has a thermostat generally denoted by the numeral 60 which includes a rigid plastic housing 62 of thin, rectangular configuration that is secured to and disposed inside diffusing structure 20 adjacent inlet 16. The downstream section 52 of pressure conduit 36 terminates within housing 62, as best seen in FIG. 3, with the end 54 opening into the interior of a fitting 64 secured to the housing sidewall. A plug 66 threadably received in fitting 64 has a central bore 68 defining an exhaust port for discharge of air from section 52. Housing 62 has an elongated slot 70 in a bottom wall that presents an inlet accommodating a flow of ambient air inside the housing as well as the exhaust flow through bore 68.

A thermally responsive bimetallic strip 76 is secured in cantilevered arrangement within housing 62 with one end 78 rigidly attached to the housing wall. Alternately, strip 76 could be helically wound for greater sensitivity of the instrument. The opposite free end of strip 76 has a conical element 80 affixed thereto and disposed in alignment with bore 68. In response to a change in temperature, strip 76 deflects in a generally vertical plane with conical element 80 shifting toward and away from bore 68 to vary the restriction to exhaust flow therethrough. Thus the bimetallic strip and its conical element 80 act as valve means which variably restrict exhaust flow in response to temperature of the strip.

A calibration lever 82, having an offset lower end 84 depending through slot 70 for easy accessibility is pivotally mounted to housing 62 by a nut 86 and an eccentrically disposed pin 88 that is embedded within a bearing insert 90 carried within a boss 92 on the side of housing 62. A circular cam surface 94 on the upper end of lever 82 engages strip 76 so that upon manual rotation of lever 82, the bimetallic strip and its conical valve element 80 are moved relative to bore 68.

A rigid, second conduit 96 is mounted to housing 62 by an interference fit with a bore 98 in the sidewall thereof such that conduit 96 is disposed in direct alignment with the larger diameter throat portion 74 of outlet 72. By a flexible hose (not shown) or the like, conduit 96 connects with an end 104 of a second U-shaped fitting 100 mounted in the air duct 12 (FIGS. 1 and 2) with an open end 102 facing inlet 16. Accordingly, relatively high velocity airflow from inlet 16 passes through fitting 100 to conduit 96 and directly through outlet 72 of the thermostat housing. Conduit 96 acts as an aspirating nozzle wherein the airflow there-through induced by aspiration, a flow of ambient air into housing 62 through inlet 70, across bimetallic strip 76 to discharge through outlet 72. Sufficient flow of ambient air is thereby induced by suction forces to pass across strip 76 to maintain the latter at the temperature of the ambient air.

Operation of the system and controls will be described as that of a cooling system. The conditioned air flows through inlet 16, passes across damper plate 26 into duct 12 and out across the air diffusing structure 20 associated therewith. The airflow through fitting 100 and through the aspirating nozzle defined by conduit 96, induces ambient airflow through the thermostat housing. Airflow through fitting 42 passes through conduit 36 and through tee 48 to both bladder 34 and to the exhaust port defined by bore 68.

Airflow from conduit 36 to downstream section 52 causes a certain amount of exhaust flow out of bladder 34 into downstream section 52. Tee 48 therefore acts as an aspirator drawing air-flow out of bladder 34 in relation to the airflow being exhausted out of bore 68. Accordingly, pressure within bladder 34 and therefore the position of damper plate 26 is determined by the rate of exhaust flow out of downstream section 52.

As the temperature of ambient air increases, bimetallic strip 76 will deflect upwardly moving conical valve element 80 away from bore 68 to allow a greater rate of exhaust flow. The aspirating action of tee connection 48 draws air quickly out of bladder 34 (in relation to airflow into the bladder) so that pressure in the bladder will reduce immediately in fast response to the temperature increase. As the bladder deflates, damper 26 opens more to allow greater airflow into the room to reduce ambient air temperature. Once a stabilized condition is reached, the exhaust flow out of bore 68 will be sufficient to maintain a steady pressure in bladder 34 thereby holding damper plate 26 in a correct position and allowing the necessary volume of airflow into the room to maintain the temperature.

When the room is too cool, the strip 76 will be in a position drastically metering airflow through bore 68 to allow a greater pressure to build up in the bladder and to shift damper 26 toward a more closed position so that the airflow volume into the room is reduced. The use of a single connection for both inflow and outflow of air from the bladder, along with the aspirating action of tee 48 provides a highly responsive, yet stable system for controlling bladder pressure. At the same time the control system is simple and economical in overall configuration, and of such compact design that it will not detract from the aesthetic qualities of the ventilation system. The self-contained power source for the pneumatic bladder assures that the controls will be unaffected in operation by substantial fluctuation of pressure and volume of airflow being supplied to inlet 16.

The desired temperature setting for the room is selected simply by manual rotation of calibration lever 82 to change the relative position of strip 76 to bore 68. Further, restrictor 56 can be manually adjusted to establish the maximum airflow into the room under all conditions, as the size of the adjustable opening in restrictor 56 dictates the maximum rate of exhaust flow through downstream section 52 maintain a minimum back pressure within bladder 34. Accordingly, as long as the system is operational, this minimum back pressure acts as a "stop" in holding damper plate 26 at least slightly closed to establish maximum flow volume through duct 12. Similarly, bleed port 58 allows escape of a certain amount of air from section 52 at all times to place a maximum value on the pressure that can build up in bladder 34, thereby preventing damper plate 26 from moving to its completely closed position if desired. This latter feature is particularly desirable as it assures a minimal airflow into the room for ventilation. The opening presented by bleed port 58 is manually adjustable so that the volume of minimum air flow may be varied as desired.

It will be apparent that reversal of action of the controls allows them to operate in controlling heating flow in the same manner as described above.

The embodiment of the invention illustrated in FIGS. 5-8 is quite similar to that above-described but as utilized anywhere desired within a horizontal, rectangular duct 110 of a ventilation system. Duct 110 has an inlet 112 and an inclined filter screen 114 disposed in front of the inlet. Upper and lower stops 116 and 118 integral with the walls of the duct have soft contact pads 120 thereon.

A rectangular damper plate 122 of configuration corresponding to that of duct 110 is pivotally mounted by an eccentrically located pivot 124 (as in FIG. 1 embodiment) so that airflow through the duct and gravitational forces urge the damper to its normally open position. Located within an enclosure 126 on the bottom of the duct is the same actuator arrangement as in FIG. 1, e.g., the inflatable bladder member 34, overlying hinged plate 38 and connecting arm linkage 40.

Bladder 34 is again supplied by air from the duct itself through U-shaped fitting 42 within an open end 44 facing the inlet 112 and its opposite end 46 within an open end 44 facing the inlet 112 and its opposite end 46 connected by flexible conduit 36 with bladder 34. It is contemplated that the aspirating thermostat 60 of FIG. 1 can be utilized in conjunction with the FIG. 6 arrangement to control pressure in bladder 34. To this end the second U-shaped fitting 100 is included and is connected to the aspirating nozzle of the thermostat.

Thus, by inclusion of a relatively small, unobtrusive enclosure 126 the improved actuating mechanism of the present invention is wholly enclosed within the duct for appearance purposes as well as to reduce exposure of the mechanism to dirt and impurities that would tend to detract from its operation, thereby maintaining the same advantageous features of operation and appearance as in the FIG. 1 arrangement. While the thermostat control is not illustrated in FIG. 6, it is contemplated that such may be mounted adjacent duct 110 or wall-mounted at a remote but more accessible location. The thermostat in FIG. 1 may also be located remotely if desired.

The actuating mechanism and pneumatic controls of the present invention are quite flexible in design parameters and adaptable for use with a variety of ventilation duct systems. While in the preferred embodiments illustrated, pneumatic power is derived from the air duct itself, a separate souce of pressurized air for inflating the bladder and/or feeding aspirating airflow into the thermostat housing can be used.

From the foregoing, it will be seen that this invention is one well adapted to attain all the ends and objects herein set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

I claim:

1. In an air duct ventilation system having a pressure responsive mechanism for varying the volume of airflow through the duct of the system, means for controlling pressure in said mechanism, comprising:
   means defining a passage for exhausting air from said mechanism;
   a conduit receiving air from said duct and discharging the air to an exhaust port, said conduit connected with said passage and bypassing same at an angle to induce airflow from said mechanism by aspiration in response to airflow through said conduit;
   a housing having an inlet and an outlet for accommodating flow of ambient air therethrough, said housing containing said exhaust port;
   thermally responsive valve means mounted inside said housing intermediate said inlet and outlet thereof and movable toward and away from said exhaust port to vary the exhaust of air from said mechanism to thereby control pressure therein, said valve means being movable in response to a change in temperature in the ambient air; and
   means connected with said housing for inducing by aspiration a flow of ambient air through said inlet across said valve means and out said outlet whereby said valve means is positioned and volume of airflow through said duct is varied in relation to the temperature of the ambient air.

2. Pressure control means as set forth in claim 1, wherein said inducing means includes a conduit having an open end disposed in said duct and opening in said housing in direct alignment with said outlet thereof, whereby airflow from said duct through said conduit and out said outlet of the housing induces by aspiration said flow of ambient air inside the housing.

3. Pressure control means as set forth in claim 2, wherein said valve means includes a bimetallic strip having one end secured in cantilevered arrangement to said housing, and an opposite end located in overlying relationship to said exhaust port, said strip being deflected by a change in ambient air temperature to move said opposite end of the strip relative to said exhaust port and variable meter flow of exhaust air therethrough.

4. Pressure control means as set forth in claim 3, wherein said inlet in the housing is an elongated slot in a bottom wall of the housing, said outlet being of generally circular cross-sectional area and of greater area than said conduit, said bimetallic strip being generally horizontally arranged in said housing and being deflected in a vertical direction in response to a change in ambient air temperature.

5. Pressure control means as set forth in claim 3, wherein is included a manually shiftable calibration lever mounted to said housing in engagement with said bimetallic strip, said lever being accessible for manual shifting to position said strip relative to said exhaust port to vary the pressure within said mechanism.

6. Pressure control means as set forth in claim 5, wherein said lever includes a circular cam surface in engagement with said bimetallic strip, said lever being pivotally secured to said housing at a point offset from the geometric center of said cam surface whereby manual rotation of said lever causes said cam surface to shift said bimetallic strip relative to said exhaust port.

7. Means for controlling the volume of airflow through an air duct ventilation system, comprising:

a damper plate in the air duct of the system movable to variably restrict airflow through said duct;

pneumatically operated actuator means operably coupled to said plate to move same and vary the volume of airflow through said duct in proportion to said pressure in the acutator means;

a conduit having one end is disposed in said duct for sensing pressure therewithin said conducting airflow from said duct in relation to said sensed pressure, said conduit having an opposite end terminating in an exhaust port;

an aspirating tee interconnecting said conduit intermediately thereof with said actuator means at right angle, whereby airflow through said conduit and across said aspirating tee to said exhaust port induces exhaust flow of air out of said acutator means to said exhaust port; and thermally responsive valve means shiftable toward and away from said exhaust port to variably restrict said exhaust flow of air from said actuator means, said valve means being exposed to ambient air and responsive to a change in temperature thereof to control said exhaust flow.

8. Control means as set forth in claim 7, wherein is included an adjustable restrictor interposed in said downstream section of the conduit for establishing the maximum rate of said exhaust flow from the actuator means to thereby establish the maximum volume of airflow through said duct when said valve means is in a position allowing maximum flow through said exhaust port.

9. Control means as set forth in claim 8, wherein is included a manually adjustable bleed port in said downstream section of the conduit open to ambient air for establishing a minimum rate of said exhaust flow from said actuator means to thereby establish the minimum volume of airflow through said duct when said valve means is in a position allowing minimum flow through said exhaust port.

10. Control means as set forth in claim 7, wherein is included means extending generally transversely to the direction of airflow in said duct and pivotally mounting said damper plate to said duct, said pivot means being secured to said damper plate at a position offset from the center of said plate whereby the pressure of airflow in said duct acting on said damper plate urges the latter toward a position permitting maximum volume of airflow through said duct.

11. Control means as set forth in claim 7, wherein said actuator means includes a pneumatically inflatable member supplied with pressurized air from said aspirating tee, a rigid plate over-lying said member and having one end pivotally attached to said duct whereby inflation of the member rotates said rigid plate in proportion to the pressure in said member, said rigid linkage having opposite ends connected to said damper plate and said rigid plate whereby rotation of said rigid plate shifts said damper plate proportionately in relation to said pressure in the member.

12. Control means as set forth in claim 7, wherein is included a housing enclosing said valve means and said exhaust port, and having an inlet and outlet for accommodating flow of ambient air therethrough, and means connected with said housing for inducing by aspiration a flow of ambient air through said housing and across said valve means whereby said valve means is positioned and the volume of airflow through said duct is varied in relation to the temperature of the ambient air.

* * * * *